Inventor
G. K. VAN STEYN

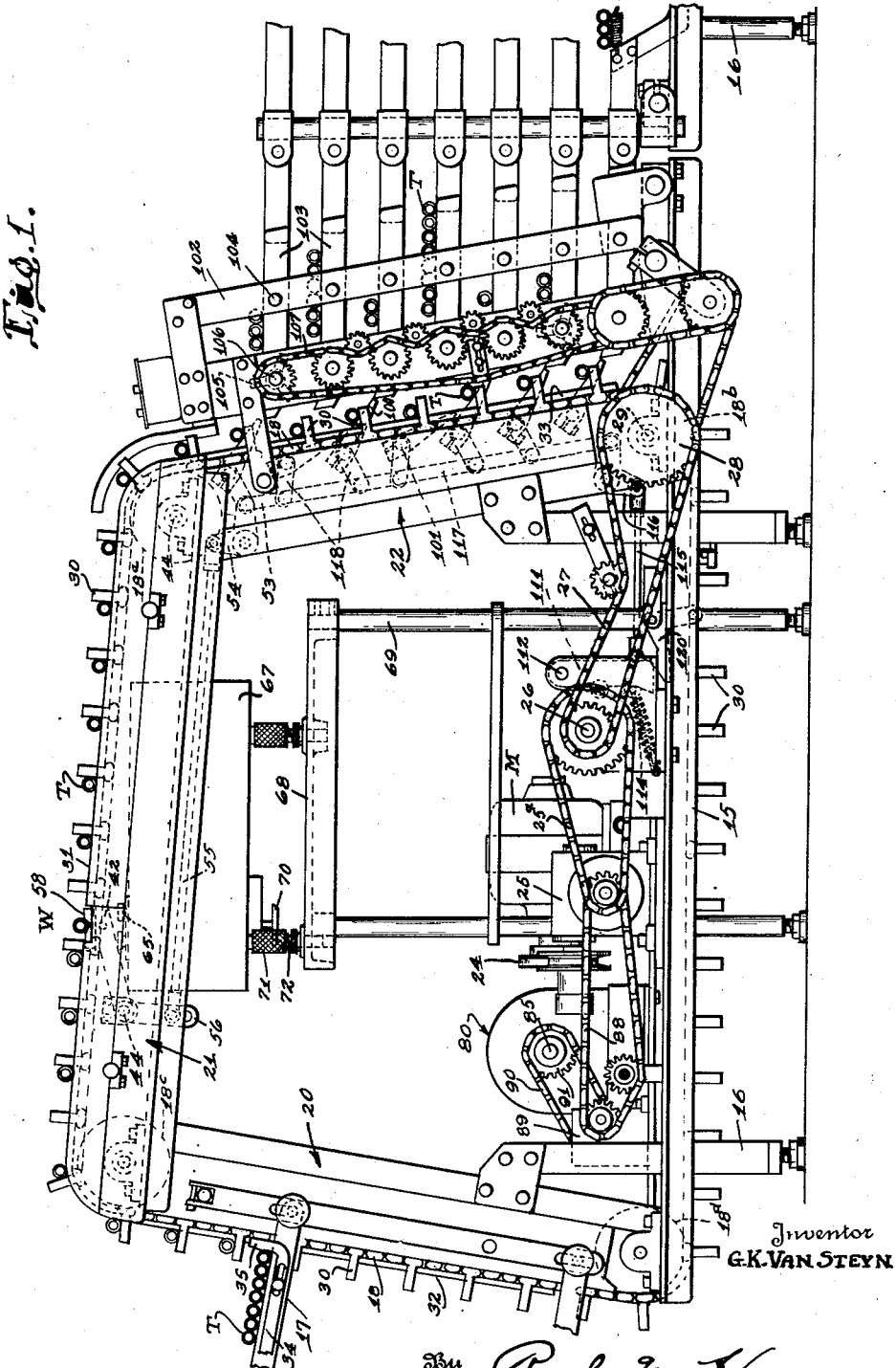

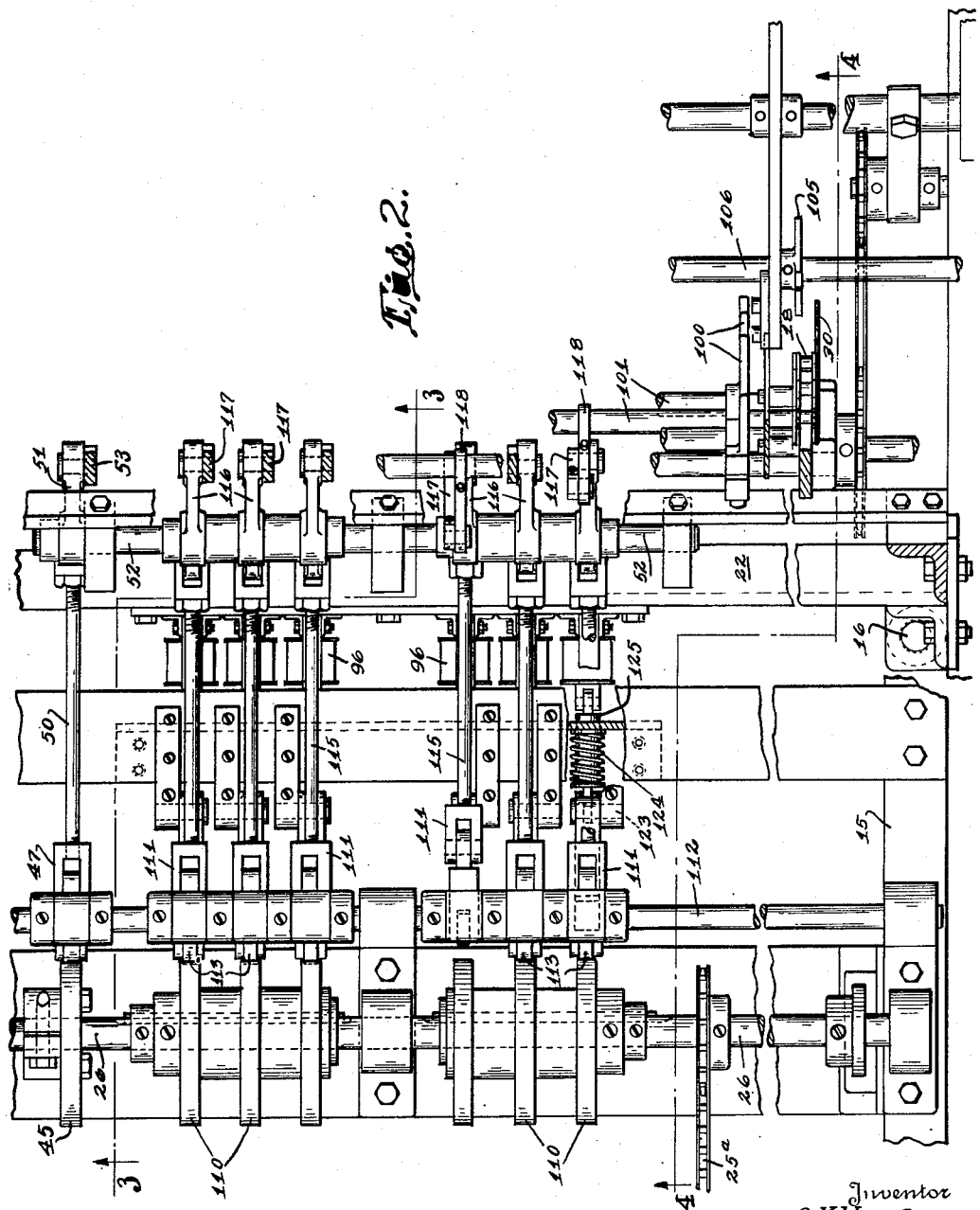

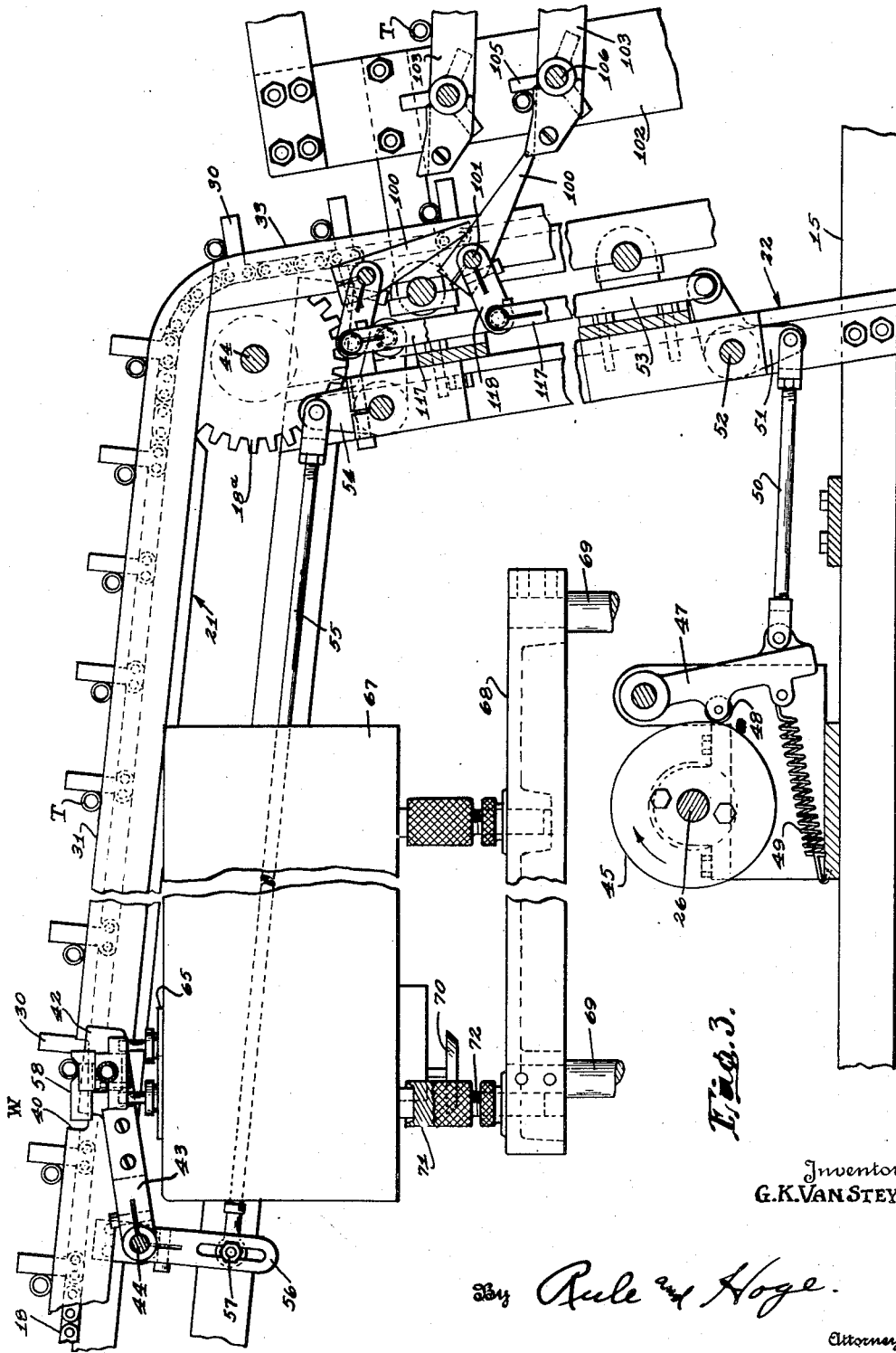

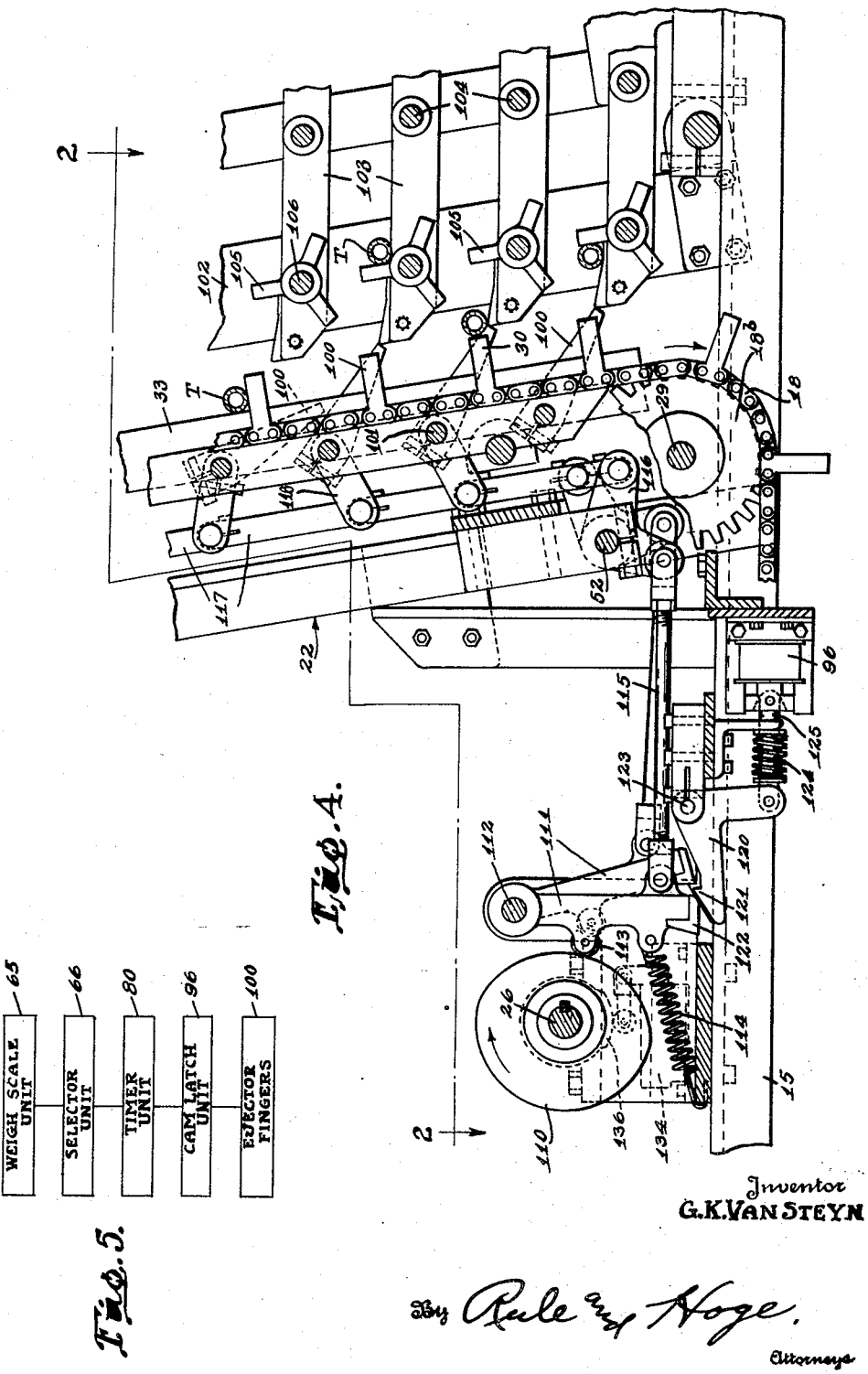

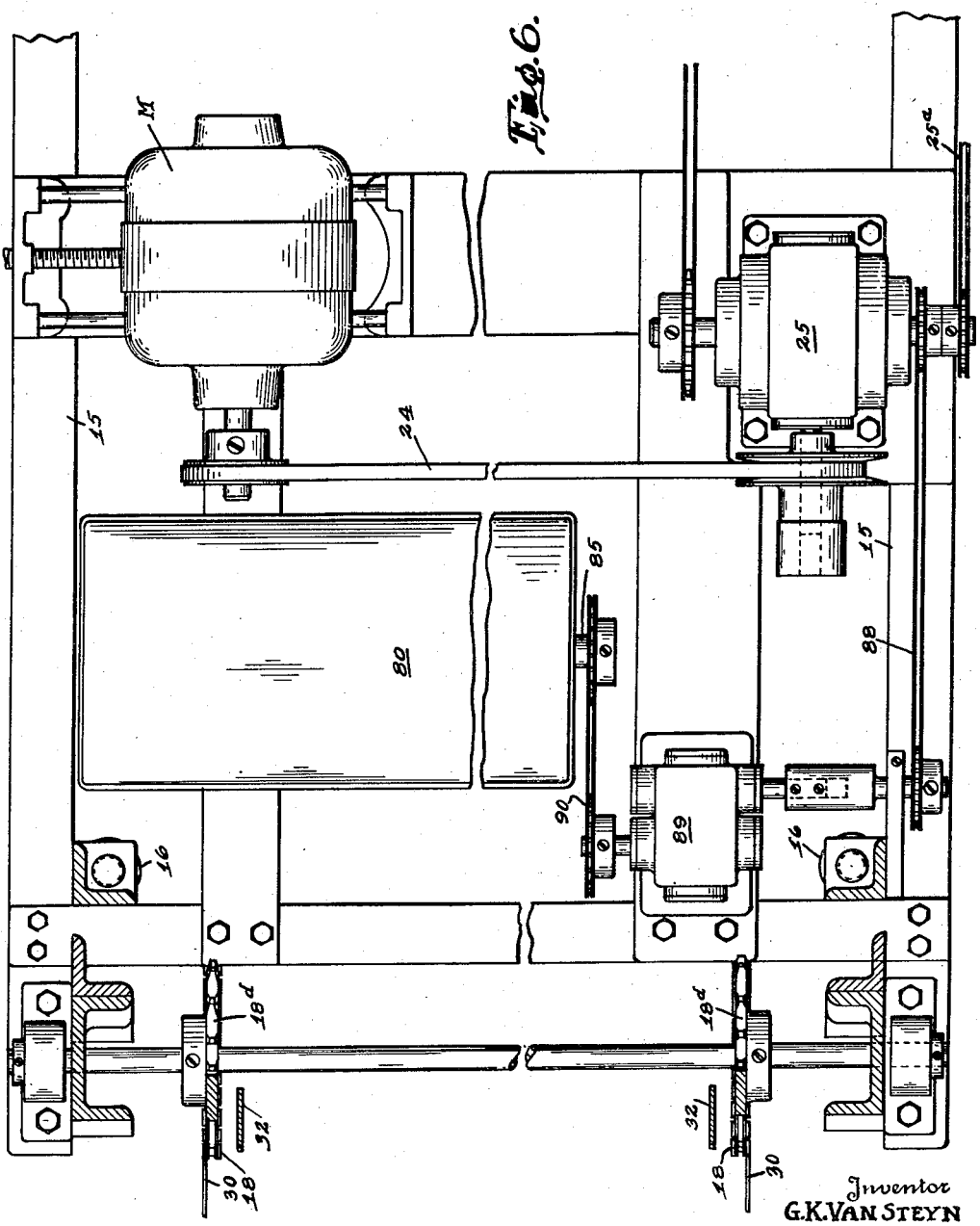

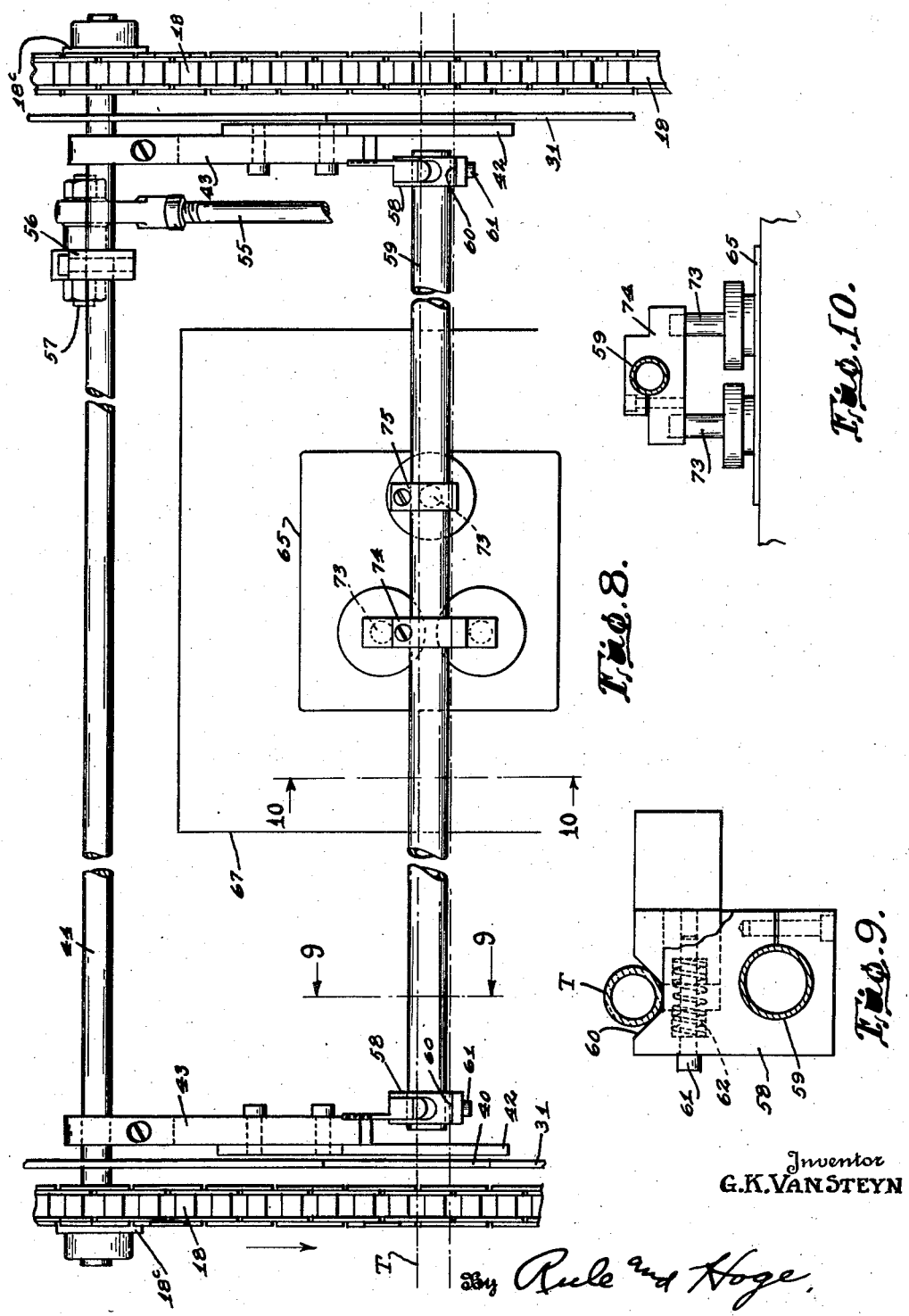

By Rule & Hoge.
Attorneys

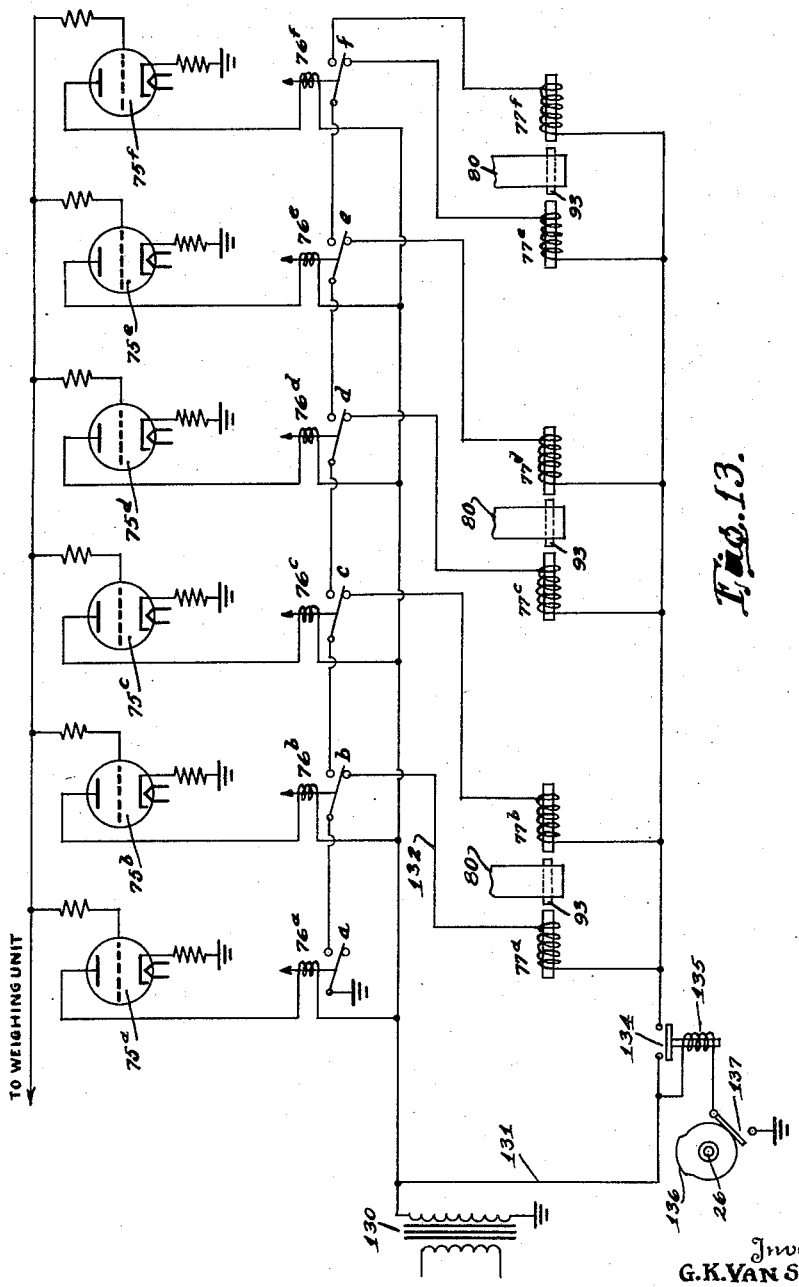

Inventor
G. K. VAN STEYN
By Rule & Hoge
Attorneys

United States Patent Office 2,710,690
Patented June 14, 1955

2,710,690
AUTOMATIC TUBE WEIGHING AND CLASSIFYING MACHINE

Gerard K. Van Steyn, Vineland, N. J., assignor to Owens-Illinois Glass Company, a corporation of Ohio Application June 24, 1952, Serial No. 295,283

17 Claims. (Cl. 209—121)

My invention relates to apparatus for weighing articles and classifying or segregating them into groups in accordance with their weight. The invention in the form herein illustrated is adapted for weighing and classifying rods or tubes and similar articles. It is of utility for weighing and classifying glass tubes and is herein described as used for such purpose although the invention is not limited to such use.

An object of the invention is to provide an automatic tube weighing machine of the character indicated, adapted for rapidly and accurately weighing and classifying or grading the tubes by weight with a very small weight increment between successive groups or classifications. The apparatus includes means for feeding the tubes to a continuously traveling endless conveyor comprising conveyor chains with lugs for advancing the tubes singly and in succession to a weighing station where the forward movement of each tube is temporarily arrested and the tube weighed by an electric or electronic scale unit and also classified according to its weight by an electronic unit. After being weighed, the ware is carried forward and then downwardly in front of a ware receiving magazine onto which the tubes are discharged at different levels corresponding to their weight classification. The discharge of these tubes at these levels is caused by discharge fingers which are cam actuated under the control of a timer device in a manner hereinafter set forth.

Referring to the accompanying drawings:

Fig. 1 is an elevational view of a weighing and classifying apparatus constructed in accordance with the present invention;

Fig. 2 is a part sectional plan view, parts of the apparatus being broken away, the section being taken at the line 2—2 on Fig. 4;

Fig. 3 is a sectional elevation on a larger scale at the line 3—3 on Fig. 2;

Fig. 4 is a sectional view at the line 4—4 on Fig. 2;

Fig. 5 is a schematic view indicating the sequence of operations;

Fig. 6 is a plan view of the motor and transmission mechanism, the machine frame being shown in section;

Fig. 8 is a plan view with parts broken away, of a rocker frame and associated parts at the weighing station;

Figure 7:
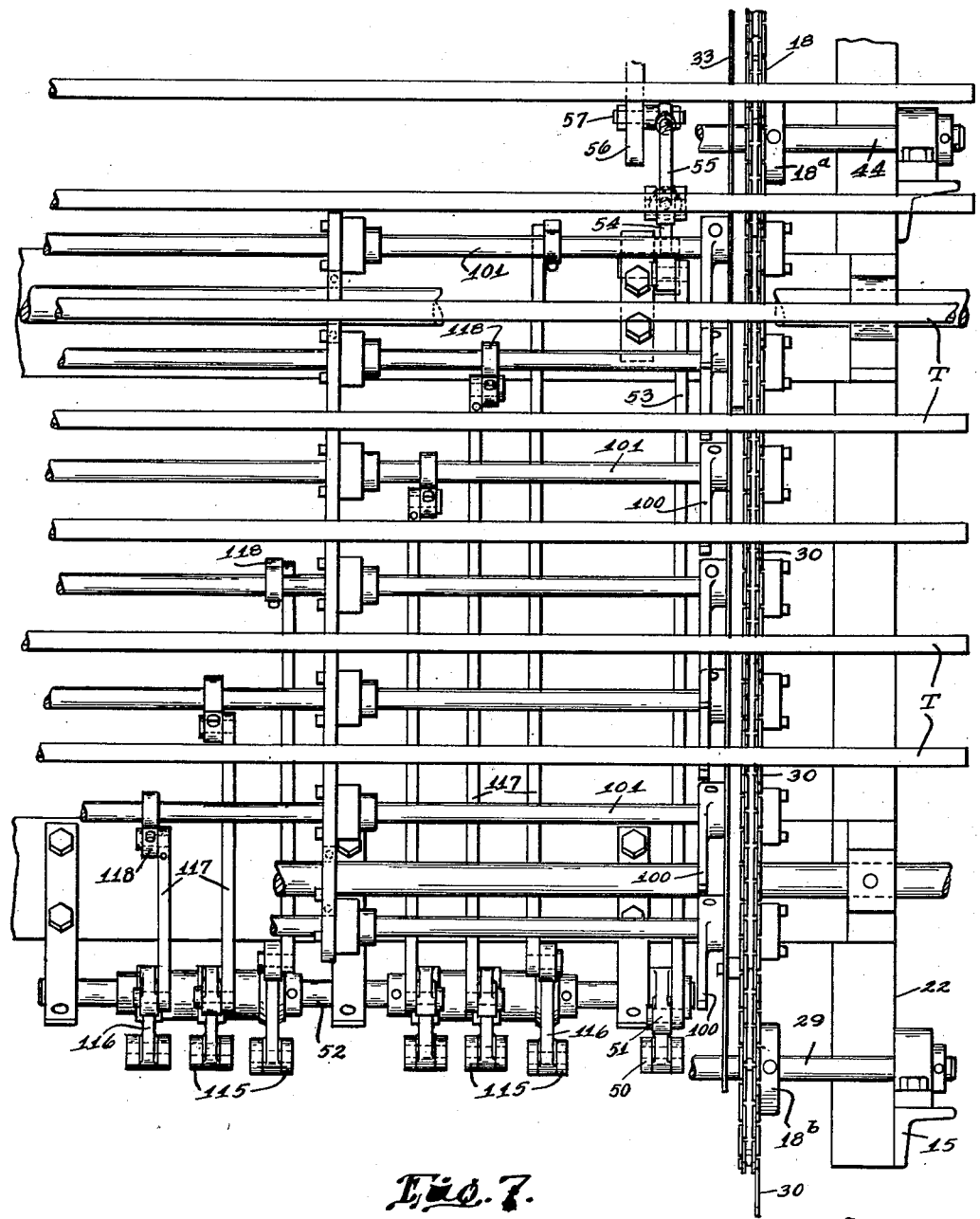
Fig. 7 is a front elevational view of the apparatus, with parts broken away, showing operating connections between the discharge fingers and their cams.
Figure 12:
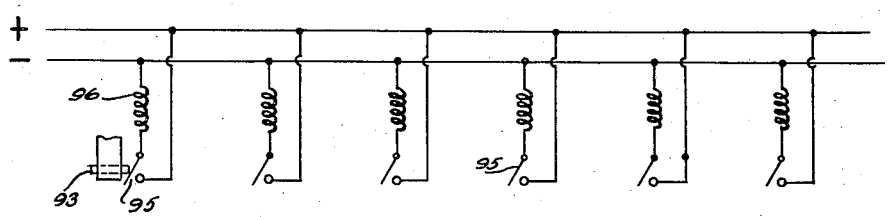
Figure 11:
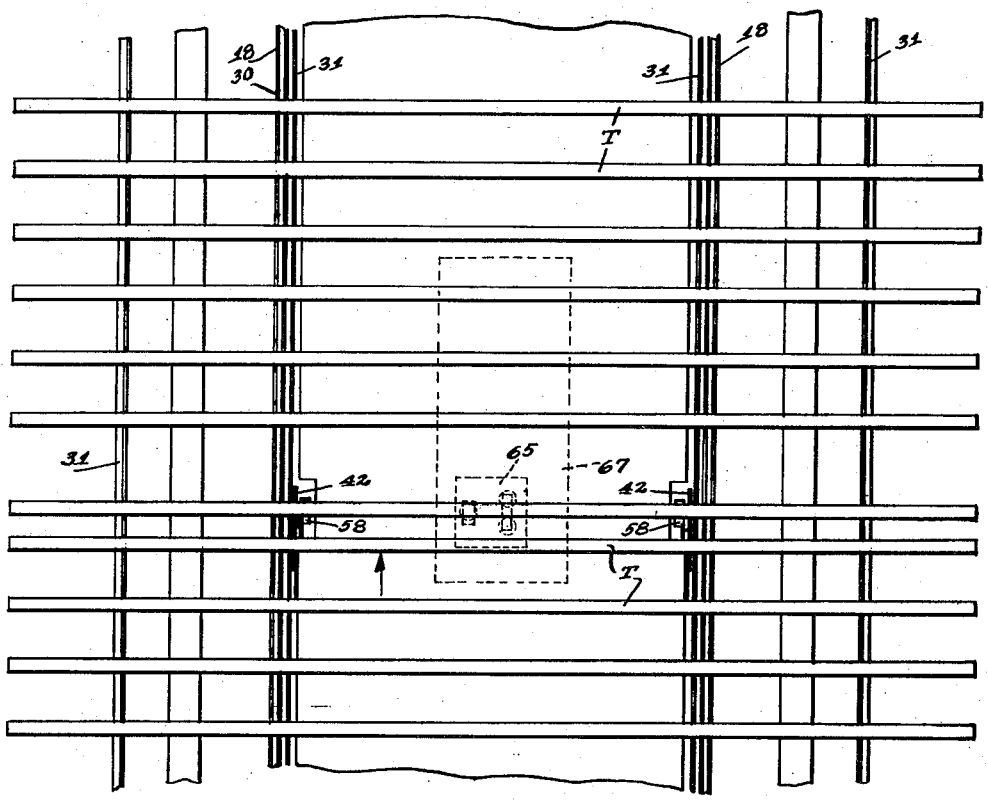
Figure 14:
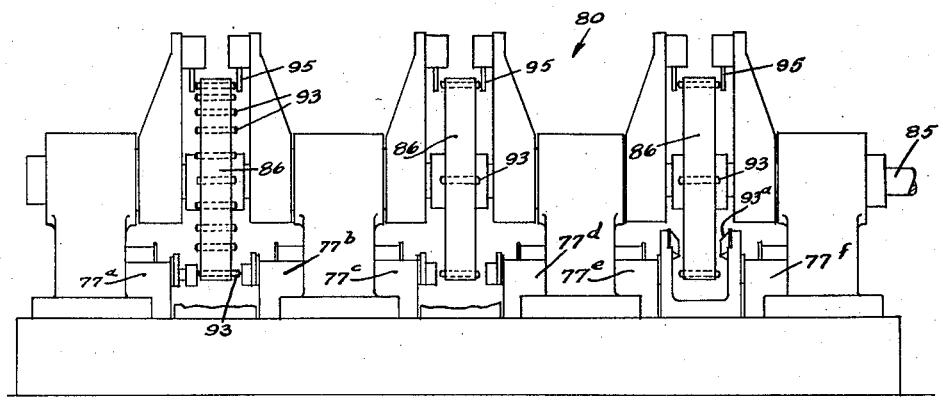

Figs. 9 and 10 are sectional detail views at the lines 9—9 and 10—10 respectively on Fig. 8;

Fig. 11 is a fragmentary plan view showing a portion of the endless conveyor mechanism;

Fig. 12 is a wiring diagram of solenoids for actuating the latches for the cam followers;

Fig. 13 is a wiring diagram of the selector and memory units;

Fig. 14 is an elevational view of the time delay or "memory" unit; and

Figure 15:
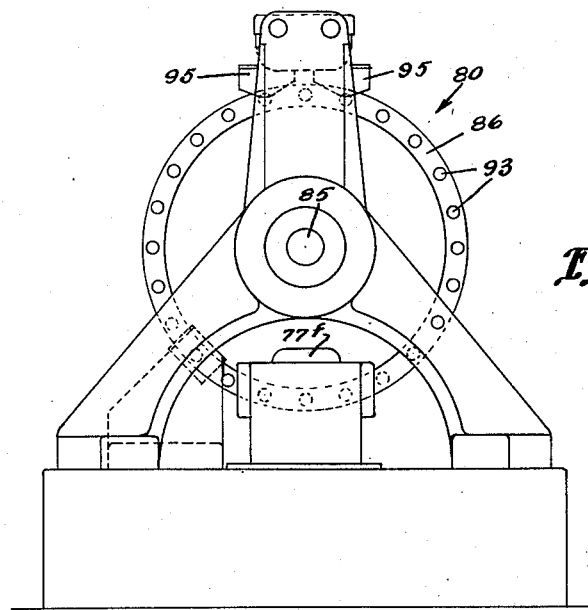

Fig. 15 is an end elevation of the same.

Referring to Fig. 1, the apparatus is carried on a framework 15 mounted on posts 16. The ware to be weighed and classified is herein shown as consisting of glass tubes T which are delivered by a feeder device 17 to an endless chain conveyor mechanism comprising a pair of parallel endless conveyor chains 18. The chains are trained over sprocket wheels journaled in the conveyor frame which includes rear frame members 20 extending upwardly from the base of the machine and inclined forwardly, upper frame members 21 which are downwardly and forwardly inclined at a small angle to the horizontal, and front frame members 22 which are also downwardly and forwardly inclined at a small angle to the vertical.

The conveyor chains 18 are driven by a motor M (Fig. 6) which has driving connections with the conveyor through a belt 24, transmission gearing within a gear box 25, a sprocket chain 25$^a$ which drives a cam shaft 26, and a sprocket chain 27 which is driven from the shaft 26 and is trained over a sprocket wheel 28 keyed to the conveyor drive shaft 29. The conveyor chains 18 are trained over upper front sprocket wheels 18$_a$, lower front sprocket wheels 18$_b$, upper rear sprocket wheels 18$_c$, and lower rear sprocket wheels 18$_d$. The conveyor chains 18 are driven continuously at a constant speed, and are provided with lugs 30 arranged in pairs uniformly spaced and extending outwardly perpendicular to the chains or to their direction of travel. The tubes T during their travel with the conveyor are supported and held out of contact with the chains by stationary supporting rails including top rails 31, rear rails 32, and front rails 33.

The feeder device 17 (Fig. 1) by which the tubes are fed to the conveyor, includes adjustable feeder control arms 34 with upturned guiding fingers 35. Each pair of lugs 30 as they move upwardly picks up a tube T. The arms 34 are adjusted to the size of the tube. The lugs 30 being upwardly and outwardly inclined as they move upward prevent the tubes from rolling off. As the tubes are carried onto the upper supporting rails 31 the inclination of said rails causes each tube to roll forward by gravity into contact with the next pair of lugs which thereafter controls the forward travel of the tube. As the tube moves forward it is brought to a weighing station W (Figs. 1 and 3).

At the weighing station the supporting rails 31 have a portion cut away to provide a gap 40 which permits each tube to be moved downwardly for the weighing operation. After the tube is weighed and classified as hereinafter described, it is again lifted and returned to the support of the rails 31 as it advances beyond the weighing station. The transfer means for lowering and lifting the tube at the weighing station includes short rail sections or bars 42 corresponding in length to the gaps 40 and attached to rock arms 43 for up and down movement. The bars 42 in their upper position have their tube supporting edges in line with the upper edges of the rails 31. The rock arms 43 are fixed to a rock shaft 44 journaled for rocking movement in the conveyor frame. The means for lifting and lowering the rail sections 42 includes a cam 45 (Figs. 2 and 3) keyed to the continuously rotating cam shaft 26. Operating connections between the cam 45 and the rail sections or bars 42 include a rock arm 47 carrying a cam follower roll 48 held to the cam by a tension spring 49. The arm 47 is connected through a link 50 to a bell crank lever 51 which rocks on a shaft 52 and is connected by an upwardly extending link 53 with a bell crank 54 connected through a rod 55 with a depending arm 56 keyed to the shaft 44. The rod 55 has a slot and pin connection 57 with the arm 56 for adjusting the lowered position of the bars 42. The cam 45 makes one complete rotation during the movement of the conveyor the distance between centers of each two adjacent lugs 30 so that the rail sections 42 are lowered as each tube T is brought to the weighing station.

While a tube T is being lowered, weighed and again returned to the support of the inclined rails 31, the lugs 30 immediately in front of the tube and which have controlled the forward travel of the tube until arrested at the weighing station, continue their forward travel during the weighing operation. Such operation, however, is completed before the next succeeding lugs 30 immediately behind the tube have advanced far enough to interfere. The tube which has just been weighed will then roll forward again into contact with the same lugs 30 as before such weighing operation. The length of time the tube is delayed at the weighing station is less than the time required for the conveyor to travel the distance between adjacent lugs 30. It will be noted that each tube during its forward travel is maintained by gravity spaced in advance of the driving lugs 30 directly behind it from the time the tube reaches the upper rails 31 of the conveyor frame until they are transferred to the receiving magazine.

The weighing and selector mechanism comprises an electronic weighing scale unit 65 and a selector unit 66 for the weighing and selecting or classifying operations. These units are housed within a casing 67 mounted on a platform 68 carried on posts 69. The scale unit is provided with feet 71 of rubber or like material and set on leveling screws 72. This unit is nested within the main machine but has no physical contact with it and is thus maintained practically free from vibrations set up by the chain drives and ware transfer mechanism. The weighing unit includes a scale pan 70 on which weights may be placed for adjustment. The weighing scale mechanism may be of a known construction such as disclosed for example in the patent to Schieser et al. 2,568,255, September 18, 1951.

Referring to Figs. 8 to 10, the weighing mechanism includes an outrider to which each tube T is transferred by the lowering of the bars 42. This outrider comprises a horizontal tubular rod 59 with supporting heads 58 mounted thereon adjacent the ends of the rod. Each supporting head comprises telescopically connected sections formed with inclined supporting surfaces 60 which provide a trough to receive and hold the tube T and which prevent forward travel of the tube during the weighing operation. The sections of each head 58 are adjustable toward and from each other by means of a screw 61 thereby adjusting the trough for ware of different sizes. Expansion coil springs 62 hold the sections in their adjusted position. The weight of the article or tube T is transferred to the scale beam through posts 73 connected to or in contact with heads 74 and 75 clamped to the rod 59.

The weight of the tube when transmitted to the weighing unit moves the scale beam to a position determined by the weight of the article. Such movement of the scale beam actuates the selecting or classifying apparatus including a series of electron tubes as shown in Fig. 13, the number of these tubes being determined by the number of classes into which the articles T are grouped according to their weight. These electron tubes are designated 75a, 75b, 75c, 75d, 75e, and 75f. As before noted the apparatus as herein shown is adapted for distributing the tubes T into seven groups or classifications. The first classification includes all tubes which are underweight, that is, less than the smallest permissible weight. The last classification includes all tubes which are overweight. The electron tubes 75a to 75f control and operate a series of relays 76a to 76f as hereinafter described. These relays in turn control the operation of the electromagnets 77a to 77f of the time delay device 80. The time delay unit causes a delayed action of the means for directing the classified tubes to their respective compartments of a receiving magazine rack.

The time delay or "memory" unit 80, as shown partly diagrammatically in Figs. 14 and 15, includes a shaft 85 on which are mounted three discs or wheels 86. The shaft 85 is driven continuously by the motor M having driving connections therewith through a train of gearing including sprocket chain 88 (Figs. 1, 6) gearing within a gear box 89 and a sprocket chain 90 and sprocket wheel 91 on shaft 85. The discs 86 have mounted therein switch operating pins 93 which extend through the discs with their ends protruding and are movable lengthwise from their inoperative central position to an operative position by the action of the electromagnets 77a–77f.

Each of the discs 86 carries 24 of the pins 93 equally spaced circumferentially of the disc. The shaft 85 carrying the discs is geared to rotate in synchronism with the movement of the conveyors and is rotated the angular distance between each two adjoining pins 93 during each weighing operation, that is, while the conveyor is traveling the distance between adjacent lugs 30. Two of the electromagnets 77a to 77f are associated with each of the discs 86, being on opposite sides of the disc and so positioned that when the electromagnet is energized its armature or core shifts one of the contact pins 93 to an operative position, as shown for example in Fig. 14, where the electromagnet 77a has shifted a pin 93 to the right.

Micro-switches 95, having a stationary mounting on the timer device, extend into the path of the contact pins 93 which have been moved to operative position by the electromagnets. These switches control the operation of a series of solenoids 96 (Figs. 4 and 12) herein referred to as cam latch solenoids. The solenoids actuate a series of latches 120 which control the operation of the switching devices or fingers which direct the classified tubes into the receiving magazine as hereinafter described. Cams 93a reset the pins 93.

Referring to Figs. 1, 3, and 4, the switching devices for directing the classified tubes into the different compartments of the receiving magazine comprise the fingers 100 mounted on rock shafts 101 journaled in the conveyor frame. These fingers in their normal retracted position extend downwardly behind the path of the tubes T as the latter are carried downward on the conveyor lugs 30 and when actuated as presently described, swing forward into position to throw the tubes off the lugs 30 and onto the receiving magazine.

The magazine comprises frame members 102 spaced forwardly from and parallel with the front frame members 33 of the chain conveyor. Horizontal bars 103 are mounted on rods 104 of the magazine frame and are positioned at the proper levels to receive the classified tubes as the latter are discharged by the fingers 100. Star wheels 105 are carried on shafts 106 journaled in the magazine frame and rotated continuously for moving the tubes T forwardly on the bars 103. The means for rotating the shafts 106 comprises an endless chain 107 (Fig. 1) having driving connections with the motor M and trained over sprocket gears on the shafts 106.

The means for actuating the discharge fingers 100 will now be described. Referring to Figs. 2 and 4, cams 110 are keyed to the cam shaft 26. There are six of these cams and all of the cam mechanisms actuated thereby may be of the same construction. Each cam operates a rock arm 111 pivoted on a shaft 112 and carrying a cam follower roll 113 running on the cam and held thereto by a coil tension spring 114. Connecting rods 115 are pivoted to the cam arms 111 and extend forwardly therefrom. The front ends of the rods 115 are connected to bell cranks 116 mounted for rocking movement on the shaft 52. Rods 117 of graduated lengths are pivoted to the bell cranks 116 and extend upwardly therefrom, the upper ends of the rods being pivotally connected to rock arms 118 on the rock shafts 101 which carry the discharge fingers 100.

The cam arms 111 are normally held away from the cams in an inoperative position by cam latches 120. Each cam latch is formed with a hook 121 to engage a keeper 122 on the cam arm 111 and thereby hold it in a retracted position. The latch is pivoted at 123, and is held in engagement with the keeper 122 by a coil spring 124. The latches 120 are released by the solenoids 96 (Figs. 4 and 12). The armature of each electromagnet is connected to the cam latch by a link 125 so that when the magnet is energized the latch is pulled to released position against the opposing force of the spring 124. When a latch 120 releases the cam arm 111, the cam operates through the linkage above described to swing the corresponding discharge fingers 100 forwardly. This operation is timed to take place when a selected tube T during its downward travel is directly in front of the fingers 100 so that the latter by a quick movement throw the tubes forwardly off the supporting lugs 30 onto the rails 103. The star wheels 105 operate as a positive means to carry the tube forward on the rails 103.

Operation

The sequence of operations stated briefly consists of feeding the tubes by the feeder device 17 (Fig. 1) onto the endless chain conveyor, advancing the tubes to the weighing station W where each tube is arrested in its forward movement and transferred to the weighing scale unit 65. As indicated schematically in Fig. 5, the weighing scale operates through the selector unit 66 to classify the tube and set the time delay unit 80. The latter through its time delay action operates the particular cam latch solenoid 96 determined by the selector unit and at the proper time for causing the ejector cam 110 to operate the selected ejector fingers 100.

The manner in which these successive operations are effected may be described as follows:

As each tube T is brought to the weighing station W (Fig. 3) the rail sections or bars 42 are lowered by the cam 45 as heretofore described, thereby transferring the tube to the weighing unit. The scale beam operates in a known manner, as for example, that disclosed in the above identified patent to Schieser et al., to energize one or more of the electron tubes 75$^a$ to 75$^f$ (Fig. 13). These electron tubes operate the relays in succession, the number actuated being determined by the weight of the tube T which is being classified. If for example, the tube T is underweight, only the first electron tube 75$^a$ will be energized. This actuates the relay 76$^a$ and closes its switch $a$ which is connected in circuit with the first electromagnet 77$^a$ of the time delay unit. Electric current for actuating the electromagnets 77$^a$, etc. is supplied by the transformer 130. The circuit for the electromagnet 77$^a$ may be traced from the transformer through wire 131, electromagnet coil 77$^a$, wire 132, switch $b$, and switch $a$, the switch $a$ and transformer being grounded as shown. This circuit is open at a relay switch 134 at the time the electron tube 75$^a$ operates. The microswitch 134 is actuated by a relay 135 controlled by a cam 136 on the cam shaft 26 (Figs. 4 and 13). This cam actuates a micro-switch 137 to establish a circuit for the relay 135, thereby closing the switch 134 and completing the circuit for the electromagnet 77$^a$. This takes place immediately after the electron tube 75$^a$ has operated.

The electromagnet 77$^a$ now moves a switch pin 93 of the time delay disc 80 to operative position (Fig. 12). The particular pin 93 so set, operates after the required time interval to close the switch 95 in the circuit of the corresponding cam latch releasing electromagnet 96. In this instance the closing of the switch takes place when the selected tube T (an underweight tube), has been brought by the conveyor to a position opposite the uppermost compartment of the receiving magazine. The solenoid 96 now operates to release its latch 120 and permit the corresponding cam 110 to actuate the ejector fingers 100, thereby transferring the tube to the said uppermost compartment of the receiving rack.

If a tube at the weighing station is not underweight, two or more of the electron tubes 75$^a$ to 75$^f$ (Fig. 13) will be energized and operate in succession the corresponding relays 76$^a$ etc., the number operated being determined by the weight of the tube T. If, for example, the tube is within the first classification above that of the underweight tubes, the electron tubes 75$^a$ and 75$^b$ will operate to close their switches $a$ and $b$. The relay 135 will then complete the circuit for the electromagnet 77$^b$ of the time delay device. This circuit extends from the electromagnet coil through the switches $c$, $b$, and $a$. It will be noted that the switch $b$ when actuated to make a circuit for the electromagnet 77$^b$, at the same time breaks the circuit through the electromagnet 77$^a$. This takes place while the switch 134 is still open so that when the latter closes immediately following the operation of the electron tubes, only the electromagnet 77$^b$ will be energized. This electromagnet and corresponding microswitch 95 (Fig. 14) are so positioned relatively that the switch pin 93 set by the electromagnet 77$^b$ will operate when the tube T, as it is carried downward along the front of the conveyor frame, reaches its classification level. At this point the switch pin 93 closes its associated switch 95 so that the cam latch solenoid operates and the discharge fingers 100 transfer the tube to the proper section of the receiving rack. During each weighing operation a number of the electron tubes are energized in succession, the number corresponding to the weight of the tube, and remain energized until the cam operated micro-switch 134 is closed. Each of the electron tubes when thus energized, operates to establish a circuit for the corresponding electromagnet of the time delay device and at the same time opens the circuit for all of the preceding electromagnets 77$^a$, etc., so that when the relay 135 completes the circuit, only one of the time delay electromagnets (77$^a$–77$^f$) is energized, namely the one corresponding to the particular weight classification of the tube which is being weighed. It will be seen that only one pair of discharge fingers 100 is under the control of each of the time delay electromagnets and that each of such electromagnets controls only one classification group. After each weighing operation, the classification or selector unit comprising the electron tubes is reset as by means of a cycle reset control such as disclosed in the above mentioned patent to Schieser et al.

Modifications may be resorted to within the spirit and scope of my invention.

I claim:

1. Apparatus for weighing and classifying tubes and other articles, including an endless chain conveyor, a conveyor framework supporting the conveyor, means for driving the conveyor, said framework including article supporting surfaces extending parallel with the direction of travel of the conveyor and downwardly and forwardly inclined at a small angle to the horizontal, lugs carried by the conveyor and spaced at intervals therealong, said lugs projecting outwardly from the conveyor substantially perpendicular thereto and protruding beyond the said supporting surfaces and thereby providing means to control the forward movement of the articles and space them along the conveyor, the said supporting surfaces being inclined at such an angle that the articles thereon roll forward by gravity as they advance with the conveyor so that each article is normally positioned directly behind and in contact with a pair of said lugs during said travel, a weighing device positioned beneath the inclined portion of the conveyor, and automatic means operating in synchronism with the travel of the conveyor for arresting the forward movement of each article and transferring it to the weighing device for a weighing operation and thereafter returning it to said supporting surfaces before the next succeeding article has been brought into position for transfer to the weighing device, article ejecting devices positioned at intervals along the conveyor in advance of the automatic weighing station, electroresponsive devices individual to the ejecting devices, means actuated by said electroresponsive devices to effect operation of the corresponding ejecting devices, a time delay unit comprising circuit control elements individual to and controlling the operation of said electroresponsive devices, and means actuated by the weighing device for selectively setting said circuit control elements and thereby effecting the operation of the corresponding ejecting devices at predetermined time intervals after the weighing operations.

2. Apparatus for weighing tubes and other cylindrical articles, classifying the articles according to weight and collecting the classified articles into groups according to said classification, said apparatus comprising endless conveyor chains, a conveyor framework on which said chains are supported, said chains comprising upwardly and forwardly inclined leads at the receiving end of the apparatus, upper leads forwardly and downwardly inclined at a small angle to the horizontal and downwardly and forwardly inclined leads at the forward end of the conveyor framework, means for driving the conveyor chains, lugs attached to the chains at uniformly spaced positions lengthwise thereof and projecting outwardly substantially perpendicular to the chains and their direction of travel, said framework comprising stationary article supporting surfaces extending along said upper leads in the direction of travel of the conveyor and positioned to form a support for the articles and hold them off the conveyor thereby providing means whereby the articles are caused to roll along said surfaces with each article normally directly behind and in contact with a pair of lugs and spaced forwardly from the next succeeding lugs, and automatic means for interrupting the forward movement of each article at a weighing station adjacent its path of travel and intermediate the ends of said upper leads and weighing the article at said station, selector means actuated by the weighing means to classify the article as to its weight, a time delay device actuated by the selector means, and means actuated by the time delay device for discharging the article at a position determined by the weight classification, the articles being discharged at separate points corresponding to the weight classification.

3. The apparatus defined in claim 2, the article discharging means comprising discharge fingers mounted on the front frame member at different levels corresponding to the weight classification, said lugs being upwardly and outwardly inclined during their downward travel at the front end of the conveyor and thereby supporting the articles and preventing them from rolling off the lugs, said ejector fingers being positioned normally behind and out of the path of the articles, and selective means mounted separately from and operated independently of the conveyor chains for selectively operating the discharge fingers for throwing the articles off the conveyor.

4. Apparatus for weighing articles and classifying them according to their weight, said apparatus comprising an endless conveyor, means for driving the conveyor, spacing devices on the conveyor and uniformly spaced at intervals along the conveyor for maintaining the articles in spaced positions along the conveyor, a weighing unit at a weighing station adjacent to the path of the articles on the conveyor, automatic transfer means at the weighing station for transferring each article to the weighing unit, causing said unit to weigh the article, and thereafter returning the article to the control of the conveyor, said transfer means comprising supporting arms in position to receive and support each article as the latter approaches the weighing unit and power operated mechanism for lowering and lifting said supporting arms in periodically timed relation to the movement of the conveyor, means actuated by the weighing unit to classify the articles according to their weight, time delay mechanism controlled by the classification means, and article discharging means controlled by said time delay mechanism for discharging each article from the conveyor when it reaches a position determined by its weight classification.

5. The apparatus defined in claim 4, said article discharging means comprising ejector devices having a stationary mounting at spaced positions lengthwise of the path of travel of the classified articles, and electro-responsive means controlled by the said time delay mechanism to cause the operation of each said ejector device.

6. The apparatus defined in claim 4, the said spacing means comprising lugs attached to and projecting outwardly from the conveyor.

7. Apparatus for weighing tubes or similar articles, classifying them according to weight and collecting them into groups according to said classification, said apparatus comprising a traveling conveyor, a conveyor frame including an upper frame member approximately horizontal and extending in the direction of travel of the conveyor therealong, spacing devices attached to the conveyor at equally spaced intervals therealong and projecting outwardly from the conveyor, article supporting rails extending along said upper frame member and having article supporting surfaces parallel with and spaced above the path of the conveyor along said upper frame member, said rails comprising sections spaced apart in the direction of their length at a weighing station, a weighing unit, article lowering and lifting means comprising bars bridging said spaces, means for periodically lowering and lifting said bars and thereby transferring each article to the weighing unit and returning it after it is weighed to the said supporting rails and to the control of the conveyor, article ejecting means for removing the articles from the conveyor after their return to the supporting rails, said ejecting means comprising ejector devices mounted at intervals along the conveyor frame, and means including said weighing unit to classify each article according to its weight and thereafter operate an ejector device corresponding to the weight classification of the said article.

8. Apparatus for weighing and classifying articles according to their weight, which comprises a conveyor frame including end frame members and a top frame member, an endless conveyor mounted to travel on said frame, means for continuously driving the conveyor, the conveyor having a straight-line stretch extending along the top frame member, article supporting means extending along said top frame member and having a stationary supporting surface parallel with and extending along said stretch on which the articles are supported during their forward movement along said stretch of the conveyor, said conveyor having lugs projecting outwardly therefrom at short intervals along the conveyor and projecting upwardly above said supporting surface and controlling the position of the articles while they are moving along said stretch, a weighing unit positioned beneath said supporting surface at a weighing station intermediate the ends of said stretch, means for arresting the forward movement of each said article when brought to the weighing station, a movable element at the weighing station in position to receive and support each article as it is brought to said station, automatic means for periodically lowering and raising said element in timed relation to the movement of the conveyor and thereby transferring the article supported thereon to the weighing unit and thereafter returning the article to said supporting surface and to the control of the conveyor for continued movement along said straight-line stretch, means actuated by the weighing unit for classifying the articles according to their weight while at the weighing station, a time delay unit set by said weighing and classifying means, ejectors positioned at intervals along the path of the weighed articles, and means actuated by the time delay unit for operating the ejectors and thereby discharging the articles from the conveyor at predetermined positions corresponding to their weight classification.

9. Apparatus for weighing and classifying tubes or similar articles which comprises an endless chain conveyor and a conveyor frame including a base and members extending upwardly therefrom and an upper frame member, said upper frame member including forwardly and downwardly inclined article supporting rails, the conveyor having a path of travel extended along the rails and below the article supporting surfaces of the rails, said conveyor having lugs projecting outwardly beyond said supporting surfaces and thereby providing means to control the forward movement of the articles along the rails, a weighing unit mounted beneath and adjacent to said supporting surfaces at an intermediate position along the rails, transfer means for lowering each article at the weighing station to the weighing unit and thereafter lifting it and returning it to the support of the rails, said transfer means including a movable element in position to receive and support each article as it is brought to the weighing station, means for driving the conveyor, and interconnected gearing between the conveyor and the said movable element for periodically lowering and raising said element with the article supported thereon in timed relation to the movement of the conveyor, the transfer means including means for arresting forward travel of the article during the weighing operation, the inclination of the said supporting rails being at an angle to permit the articles to roll forward by gravity under the control of said lugs, the lugs being spaced apart in their direction of travel a sufficient distance to permit the weighing operation and the return of the article to the support of the rails within the time of travel of the conveyor the distance between succeeding lugs.

10. Apparatus for weighing tubes or similar articles, classifying them according to weight and grouping them in separate groups corresponding to their weight classification, said apparatus including an endless conveyor, a conveyor frame comprising an upper frame member downwardly and forwardly inclined at a small angle to the horizontal, and a front frame member downwardly and forwardly inclined at a small angle to the vertical, article supporting and guiding rails including upper rails and front rails extending along said upper and front frame members respectively and having downwardly and forwardly inclined article engaging surfaces, means for mounting the conveyor for travel in a closed path, the conveyor having stretches which extend along said rails respectively and substantially parallel with the said article engaging surfaces, lugs attached to the conveyor at intervals therealong and projecting outwardly beyond the supporting surfaces of the rails and controlling the forward movement of the articles along the rails, means for supplying articles in succession to the conveyor, a weighing unit positioned directly beneath the path of travel of the articles along said supporting surfaces of the upper rails at an intermediate position along said surfaces, transfer means for transferring each article to the weighing unit, weighing it and returning it to the support of said upper rails at said intermediate position for continued travel along the supporting surfaces, said transfer means including a movable element in position to receive and support each article as it is brought to the weighing station, means for driving the conveyor, interconnected gearing between the conveyor and said movable element for periodically lowering and raising said element with the article supported thereon in timed relation to the movement of the conveyor, ejector devices positioned at different heights on the said front frame member, means cooperating with the weighing unit for classifying the weighed articles, a time delay unit set by said weighing and classifying means, and means actuated by the time delay unit for operating the ejector device corresponding to the classifying of a weighed article when the latter during its downward and forward travel with the conveyor is brought opposite the ejector device, and means individual to the ejector devices for directing the ejected articles to separate positions, whereby articles of different weights are ejected at different levels and collected in separate groups according to their weight classification.

11. Apparatus for weighing and classifying tubular or other round articles, including a conveyor frame, an endless conveyor mounted on said frame, means for continually driving the conveyor, the conveyor including a downward extending lead, lugs on the conveyor and projecting outwardly therefrom and moving downwardly along the front of the conveyor, article discharging fingers pivoted on the conveyor frame and spaced lengthwise of the path of travel of the conveyor, means for weighing and classifying said articles, and means for selectively operating the discharge fingers when the classified articles are brought opposite the fingers during their downward travel, the means for actuating the discharge fingers comprising cams individual to said fingers, cam arms actuated by the cams, mechanical operating connections between the cam arms and the discharge fingers, means for holding the cam arms in an inoperative position, automatic means controlled by the weighing mechanism to selectively release the cam arms, and time delay mechanism by which the release of each cam arm is timed to effect the operation of the associated discharge finger when the classified article is brought by the travel of the conveyor into position to be discharged by said discharge finger.

12. The apparatus defined in claim 11, the means for holding the cam arms in their inoperative position comprising cam latches, electromagnets operatively connected to the latches, said time delay mechanism including means for effecting the selective operation of the electromagnets.

13. Apparatus for weighing, classifying and segregating articles into separate groups according to their weight classification, said apparatus including an endless conveyor, means for driving the conveyor in a closed path, a conveyor frame on which the conveyor is mounted and along which a stretch of the conveyor travels in a straight line, a weighing unit at a weighing station intermediate the ends of said stretch, means for spacing the articles at regular intervals along the conveyor for movement therewith along said stretch, automatic transfer means for transferring each article from the conveyor to the weighing unit when it reaches said intermediate position, causing said unit to weigh the article and returning the article to the conveyor, power means synchronized with the conveyor driving means for operating said transfer means, classification means actuated by the weighing unit to classify each article as it is weighed according to its weight, a time delay apparatus, article ejecting devices positioned at intervals along the path of the articles beyond the weighing station, and means controlled by the time delay apparatus to actuate the said ejecting devices.

14. The apparatus defined in claim 13, said time delay apparatus including electromagnets individual to the weight classification, said classification means including electro-responsive devices for selectively controlling and operating said electromagnets, said time delay apparatus including switches individual to said electromagnets, switch operating pins, means for bringing said pins into position to be set by the operation of said electromagnets, and means for causing each pin when set to close the corresponding said switch, and electro-responsive means in circuit with the switches for controlling the operation of said ejector devices.

15. The apparatus defined in claim 13, said classification means comprising electron tubes individual to the said classes, relay electromagnets individual to said electron tubes, relay switches actuated by said electromagnets, said time delay apparatus including electromagnets in circuit with said switches, switch operating pins, a carrier for said pins, means for rotating the carrier and bringing the pins in succession into position to be set by the last mentioned electromagnets, said time delay apparatus including switches in the path of said pins when the latter are set, and electromagnets in circuit with said last mentioned switches, means actuated by said last named electromagnets to effect the operation of the ejecting devices.

16. The apparatus defined in claim 15, the last mentioned means including cams, cam arms, latches for holding said cam arms in an inoperative position, said last named electromagnets having operative connections with the latches and operative to release the cam arms, and motion transmitting means between the cam arms and said ejecting devices.

17. Apparatus for weighing articles and classifying them according to their weight, said apparatus comprising an endless conveyor, means for driving the conveyor, spacing devices on the conveyor and uniformly spaced at intervals along the conveyor for maintaining the articles in spaced positions along the conveyor, a weighing unit at a weighing station adjacent to the path of the articles on the conveyor, automatic transfer means at the weighing station for transferring each article to the weighing unit, causing said unit to weigh the article, and thereafter returning the article to the control of the conveyor, said transfer means including article supporting arms and power operated mechanism for lowering and lifting said supporting arms periodically in timed relation to the movement of the conveyor.

References Cited in the file of this patent

UNITED STATES PATENTS

| | | |
|---|---|---|
| 1,750,516 | Gray | Mar. 11, 1930 |
| 1,770,810 | Schoonenberg | July 15, 1930 |
| 1,835,186 | Schoonenberg | Dec. 8, 1931 |
| 2,217,342 | Ladrach | Oct. 8, 1940 |
| 2,521,876 | Stake | Sept. 12, 1950 |
| 2,568,255 | Schieser | Sept. 18, 1951 |